Reissued Nov. 22, 1938

Re. 20,923

UNITED STATES PATENT OFFICE 20,923

PROCESS FOR TREATING FIGS

Carl F. Love, San Jose, Calif., assignor to California Prune & Apricot Growers Association, San Jose, Calif., a corporation of California No Drawing. Original No. 2,072,309, dated March 2, 1937, Serial No. 23,454, May 25, 1935. Application for reissue November 16, 1937, Serial No. 174,805

2 Claims. (Cl. 99—156)

This invention relates to the processing of figs and has particular reference to fruit which at some time in its handling preparatory to being marketed has been allowed to dry, in contradistinction to figs which are picked fresh and sold or marketed as such.

An object of the invention is to restore the natural light color of the so-called white figs ordinarily lost in the normal process of preparing the dried fruit for market or in the storage of same preparatory to being processed for market, and to so treat the fruit that this darkening effect is further retarded, thereby lengthening the average period of marketing and consumption.

Another object of this invention is to provide a process which retards the crystallization of sugar on the exterior of the individual specimens of the fruit. This also lengthens the marketing life of the product.

Another object of the invention is to provide sterilization of the fig prior to packaging, using a medium which will pass off when its function has been performed and will leave no residue on the fruit.

Other objects and advantages will become apparent as this specification proceeds and the novelties will be defined in the appended claims.

It has been, and still is, the uniform practice in preparing figs for market to process them by immersion in boiling water or steam or by other process of rehydration. This process is necessary to the production of a clean, pliable and tender finished product. The consuming trade has been educated to demand and require such fruit. As a result of this sterilization and softening of the fruit which is, in fact, a cooking or soaking of short duration, the fruit sugars contained in the meat of the fruit are drawn to the surface and permeate the skin of the processed fruit, quickly producing an unsightly discoloration as compared with the light color of the original dried fruit prior to said processing. As the fruit so processed is later subject to any evaporation in the normal exposure in trade channels, the fruit sugar on the surface is inclined to crystallize producing a grayish appearance which is also unsightly, for in the eyes of the inexperienced consumer it resembles the appearance of a mold condition.

In addition due to improper sterilization during the preparatory process of packaging, fruit may become unfit for consumption while in the channels of trade due to spoilage caused by bacteria or molds. These three conditions, that is, darkening of the fruit, sugaring and spoilage not only retard the marketing life of the product and cause losses to all handlers, but also tend to discourage the trade handling any considerable quantity of such fruit, thereby limiting the marketing season. The invention, therefore, not only prolongs the marketing life of the product by inhibiting or retarding these influences but also increases the value of the packaged product due to greater attractiveness and resultant higher consumer appeal.

To avoid these conditions on a portion of the pack it has been for years a practice to treat figs at one point or another in their preparation for market with sulphur dioxide in order to avoid partly or to retard the conditions above described. This treatment is given either prior to or after the actual drying operation and previous to the packaging or both.

There are, however, certain difficulties which confront processors making use of this method. In the first place, quantities of sulphur compounds remain in the fruit after exposure to sulphur dioxide and their presence is not always desirable. Furthermore, the presence of certain sulphur compounds is considered by some to spoil the taste of the fruit.

Also, the presence of sulphur or its compounds in the figs has rendered them unsalable to most users of fig paste, who make up a large portion of the market for this particular fruit. Several States, while allowing certain limits of sulphur in the fruit sold in its original condition, do not allow this type of fruit to be compounded with other ingredients in products such as jams, cookies, candies, or the like.

Furthermore, the use of sulphur does not always produce all the results desired and the merchandise must be either withdrawn from the channels of trade for reprocessing or destroyed for lack of consumer appeal. Also, owing to the disadvantages of the sulphur process, sulphur is not used on a quantity of the pack and the resulting merchandise is subject to the conditions described.

I am aware that processes have been developed claiming the removal of the sulphur compound or their conversion to other substances but the disadvantages pointed out above continue to prevail.

In the practice of the present process no sulphur dioxide or compound thereof is used in any stage and thus the many problems attendant upon the use of that agent are completely overcome. At the same time the problems arising out of the necessary use of the hot water or steam or other process of hydration are also overcome more effectively than by the use of sulphur.

My process utilizes an activating inorganic peroxide such as hydrogen peroxide. The purposes described above are accomplished by the liberation of nascent oxygen in contact with the fruit at various stages after drying.

My process utilizes hydrogen peroxide in the following manner: The figs are first dried in the natural manner, without the aid of any foreign substance whatsoever. An example of this is the common practice of exposure to the sun's rays or by artificial dehydration until they are sufficiently dried to preserve them through a period of storage in bins, boxes, or bags, pending their processing and packing for shipment. This drying process is normally the function of the orchardist and grower, following which the fruit is delivered to warehouses where the fruit is stored and held until such time as sales are made calling for the preparation and delivery of a variety of packs and conditions of finished product. In preparing figs for trade shipment they are subjected to the common practice of immersion in a tank of boiling water or other process for cleansing purposes and also to soften them, so that they can be handled and molded into shapes if intended for small brick packages. My process calls for the subjection of the fruit, either prior to or after this immersion or both, to the action of hydrogen peroxide in water, either applied by spraying or dipping, or the like. The fruit is then allowed to stand from approximately twelve to fourteen hours or over night in order to allow the nascent oxygen liberated from the peroxide to perform its function.

It has been my experience that in treating the average run of fruit my process can be carried out to its best advantage when the water employed in the rehydrating, cleansing and softening step is slightly below the boiling point, that is to say, when its temperature ranges between 200° and 210° Fahrenheit. Further, that the best results are also obtained when the hot water treatment lasts from about two to seven minutes. In stating these figures, both as to temperature and time, I am merely indicating a preference and wish it understood that the same may be varied to accommodate differences in the condition of the fruit as well as climatic conditions without departing from the spirit of this invention.

While it is regarded as optional, experience has shown that some further benefits may be derived from the application of the hydrogen peroxide solution to the figs both before and after the hot water or steam or other processes of hydration. This second application can be accomplished by having the packers brush, spray, or dip the bricks of figs or other forms of finished product in the solution at any time prior to the final wrapping of the finished product. This application following the hot water or steam process may or may not precede the manual process of preparing for the final wrapping.

Further, a third application of the solution may, in certain cases prove beneficial. For example, the figs may be treated once prior to the hot water or steam or other hydration treatment, than by the application of the solution prior to the preparation of bricks or other commercial packs followed by a final treatment of the finished product before the final packaging.

Following the variety of applications heretofore outlined, the figs are packaged or handled in any of the conventional ways, such as ground into paste, packed into wooden or fibre boxes, wrapped in Cellophane or packaged in paper cartons or cans.

There are many benefits derived from the practice of the process just outlined. Laboratory tests show conclusively that the figs are much lighter in color than those treated according to old processes but they have a plumper and fuller appearance, characteristics which appeal to the prospective buyers. This plumpness is not caused by the presence of oxygen gas left by application of the solution described as might be supposed, but rather it is understood to be caused by a swelling of the skin of the fig and the fibrous substances directly beneath the skin.

My observation has been that the color of the meat of the fig is not affected by the process forming the subject matter of this invention, but does derive definite benefits from the sterilizing action of released oxygen.

The results set forth above are understood to be brought about by the following reactions: First, the bleaching is caused by nascent oxygen present in the processing released by the hydrogen peroxide in contact with the fruit. Second, the oxidized skin is rendered more impervious to the absorption of moisture and sugar syrups from the meat of the fruit which produces discoloration.

My process also opens up a new field in that so-called black figs may be sufficiently lightened in color to make them available in the manufacture of fig paste. Heretofore it has not been possible to use black figs in the manufacture of fig paste of a color suited to meet common trade specifications.

An additional practicable application of my invention is in the case of packs of fruit which have become unsalable because of changes in surface characteristics occurring during display or storage. For instance, it frequently happens that particular packs of fruit will lay in so-called "spot stocks" for many months due to lack of seasonal demand, oversupply or other trade conditions, and the exposure of this fruit results in an unsightly appearance from discoloration or drying out. It is indisputable that such fruit is not in the least interiorly affected in any way and that it is as wholesome as the day it was first packed. Ordinarily such fruit is recalled and reprocessed according to the several conventional steps or sold for the manufacture of by-products, such as fig paste, with consequent loss of profit. By the use of my process, however, such packs may be reconditioned by removing the wrappers and subjecting the brick of figs to the action of the above-described solution of hydrogen peroxide and water. This will change the characteristics of the surface sugars and lighten the color of the fruit and render it comparable to fresh packs at a fraction of the original cost of processing.

When I am describing the solution as consisting of 2% hydrogen peroxide and 98% water, it is understood that the strength of this solution must be varied to suit the condition of the figs which are being prepared. Since the natural condition of dried figs is a product the appearance of which is determined by conditions of soil and climate it is necessary to vary the strength of the solution used in this process in order to get uniform results.

What I claim and desire to secure by grant of Letters Patent is:

1. The process of treating dried figs consisting essentially in subjecting them to the oxidizing action of a hydrogen peroxide solution of effective bleaching strength and allowing them to stand for a period of at least twelve to fourteen hours while wet with said solution whereby they are lightened in color, and then washing said fruit with substantially boiling water for at least two minutes to remove said solution.

2. The process of treating dried figs consisting essentially in first subjecting the figs to the action of a solution containing a small but bleaching effective amount of hydrogen peroxide, allowing the fruit to stand for at least 12 to 14 hours, then immersing the fruit in water, the temperature of which is slightly below the boiling point, for from 2 to 7 minutes.

CARL F. LOVE.